(12) United States Patent
Lin et al.

(10) Patent No.: US 11,899,752 B2
(45) Date of Patent: Feb. 13, 2024

(54) OBJECT COUNTING SYSTEM AND OBJECT COUNTING METHOD

(71) Applicant: Wistron Corp., New Taipei (TW)

(72) Inventors: Zhao-Yuan Lin, New Taipei (TW); Zhe-Yu Lin, New Taipei (TW)

(73) Assignee: WISTRON CORP., New Taipei (TW)

( * ) Notice: Subject to any disclaimer, the term of this patent is extended or adjusted under 35 U.S.C. 154(b) by 279 days.

(21) Appl. No.: 17/339,762

(22) Filed: Jun. 4, 2021

(65) Prior Publication Data

US 2022/0215206 A1    Jul. 7, 2022

(30) Foreign Application Priority Data

Jan. 6, 2021    (TW) ................................ 110100342

(51) Int. Cl.
*G06F 18/214* (2023.01)
*G06T 7/11* (2017.01)
*A01M 99/00* (2006.01)
*G06V 10/25* (2022.01)
*G06V 10/22* (2022.01)

(52) U.S. Cl.
CPC ........... *G06F 18/214* (2023.01); *A01M 99/00* (2013.01); *G06T 7/11* (2017.01); *G06V 10/25* (2022.01); *G06T 2207/20084* (2013.01); *G06T 2207/20221* (2013.01); *G06T 2207/30188* (2013.01); *G06T 2207/30242* (2013.01); *G06V 10/225* (2022.01); *G06V 2201/03* (2022.01)

(58) Field of Classification Search
CPC ......... G06F 18/214; G06T 7/11; G06V 10/25; G06V 2201/03; G06V 10/225
See application file for complete search history.

(56) References Cited

U.S. PATENT DOCUMENTS 7,602,944 B2    10/2009    Campbell et al.
2020/0043171 A1    2/2020    Laradji et al.

FOREIGN PATENT DOCUMENTS

CN    111709935 A    9/2020

OTHER PUBLICATIONS

Zhong, Y., Gao, J., Lei, Q., & Zhou, Y. (2018). A vision-based counting and recognition system for flying insects in intelligent agriculture. Sensors, 18(5), 1489. (Year: 2018).*

(Continued)

*Primary Examiner* — David Perlman (57) ABSTRACT

An object counting system crops images into multiple split images. When a distance between at least one side of a bounding box being associated with a position of a first object in the first split image and at least one side of a bounding box being associated with a position of a second object in the second split image adjacent to the first split image is less than a tolerance value, the processor combines the adjacent first split image and the second split second split image into a merged image, so that the first object and the second object are merged into a merged object. A processor calculates a prediction number of objects based on the objects contained in these split images and the merged objects in the merged image. The object counting system automatically counts the number of bug eggs, to save manpower and provide an accurate count.

20 Claims, 9 Drawing Sheets

(56) References Cited

OTHER PUBLICATIONS

Carlo Mello et al., "Image Segmentation of Ovitraps for Automatic Counting of Aedes Aegypti Eggs", 30th Annual International IEEE EMBS Conference, Aug. 20-24, 2008, 5 pages, IEEE, US.
Teng, Hwa-Jen, "A study on using ovitraps to monitor Dengue vectors", Dengue vectors ovitrap monitoring research project (2010), 125 pages, Centers for Disease Control, R.O.C (Taiwan), Taiwan.

* cited by examiner

OBJECT COUNTING SYSTEM AND OBJECT COUNTING METHOD

CROSS REFERENCE TO RELATED APPLICATIONS

This application claims priority of Taiwan Patent Application No. 110100342, filed on Jan. 6, 2021, the entirety of which is incorporated by reference herein.

BACKGROUND OF THE INVENTION

Field of the Invention

The present disclosure relates to an object counting method and, in particular, to an object counting system and an object counting method applied to calculate the number of tiny objects.

Description of the Related Art

Dengue fever is an infectious disease transmitted by vector mosquitoes. In order to contain the spread of infectious diseases, the number of vector mosquitoes can be controlled by spraying insecticides. By observing and counting the number of vector mosquitoes in an area, it is possible to spray insecticides more efficiently and accurately to eliminate the vector mosquitoes.

The traditional method is to sample the water quality at different locations, such as filling water bottles from ponds, rivers or other standing water, and then returning the water bottles to the laboratory. Then, the water in the bottle is poured onto the absorbent cloth to induce the vector mosquito to lay eggs on the absorbent cloth, and then manually count the number of eggs on the absorbent cloth after a period of time.

However, this counting method requires a lot of manpower and man-hours, and it takes a lot of time to manually count the number of eggs on the absorbent cloth, making it hard to get real-time data on the actual count of the number of eggs. When a large number of samples are sampled, the counting time is longer, so it is impossible to spray the insecticide immediately, which may cause a large number of vector mosquitoes to breed during this period.

Therefore, an accurate dengue egg count is very important for the early prevention and control of dengue fever, especially in Southeast Asian countries. Traditionally, only manual calculation is used, which is time-consuming and labor-intensive. Therefore, how to automatically calculate the number of dengue eggs on absorbent cloth has become one of the important problems to be solved.

BRIEF SUMMARY OF THE INVENTION

In accordance with one feature of an embodiment in the present invention, the present disclosure provides an object counting method based on an image. The object counting method includes the following steps: cutting the image into a plurality of split images; inputting the split images into a neural network to identify an object from the split images; merging a first split image of the split images and a second split image of the split images into a merged image in response to a distance between at least one side of a bounding box being associated with a position of a first object in the first split image and at least one side of a bounding box being associated with a position of a second object in the second split image adjacent to the first split image is less than a tolerance value; merging the first object and the second object into a merged object and remarking a position of the merged object; and calculating a prediction number of the object according to the object in the split images and the merged object in the merged image included in the split images.

In accordance with one feature of an embodiment in the present invention, the present disclosure provides an object counting system based on an image. The object counting system includes a processor and a storage device. The processor is configured to access the programs stored in the storage device to implement an image-cutting module, an image-object detection module, a stitching module, and a result-analysis module. The image-cutting module is configured to receive an image and cut the image into a plurality of split images. The image-object detection module is configured to input the split images into a neural network to identify the object in the split images. The stitching module is configured to merge a first split image of the split images and a second split image of the split images into a merged image in response to a distance between at least one side of a bounding box being associated with a position of the first object in the first split image and at least one side of a bounding box being associated with the position of the second object in the second split image adjacent to the first split image is less than a tolerance value, so that the first object and the second object are merged into a merged object and a position of the merged object is remarked. The result-analysis module is configured to calculate a prediction number of the object according to the object in the split images and the merged object in the merged image included in the split images.

The object counting system and the object counting method can automatically calculate the number of dengue eggs on absorbent fabric through an image, which is labor-saving and provides an accurate count.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention is described with respect to particular embodiments and with reference to certain drawings, but the invention is not limited thereto and is only limited by the claims. It will be further understood that the terms "comprises," "comprising," "includes" and/or "including," in response to used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
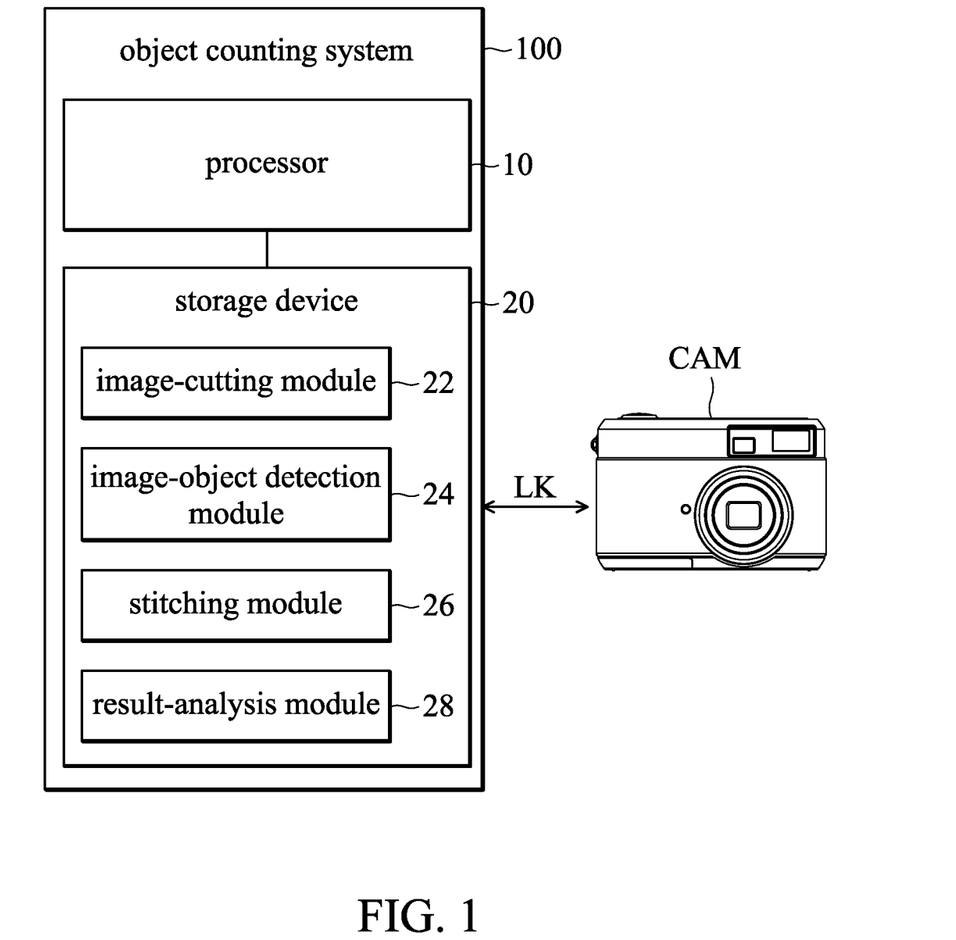
FIG. 1 is a block diagram of an object counting system in accordance with one embodiment of the present disclosure.
Figure 2:
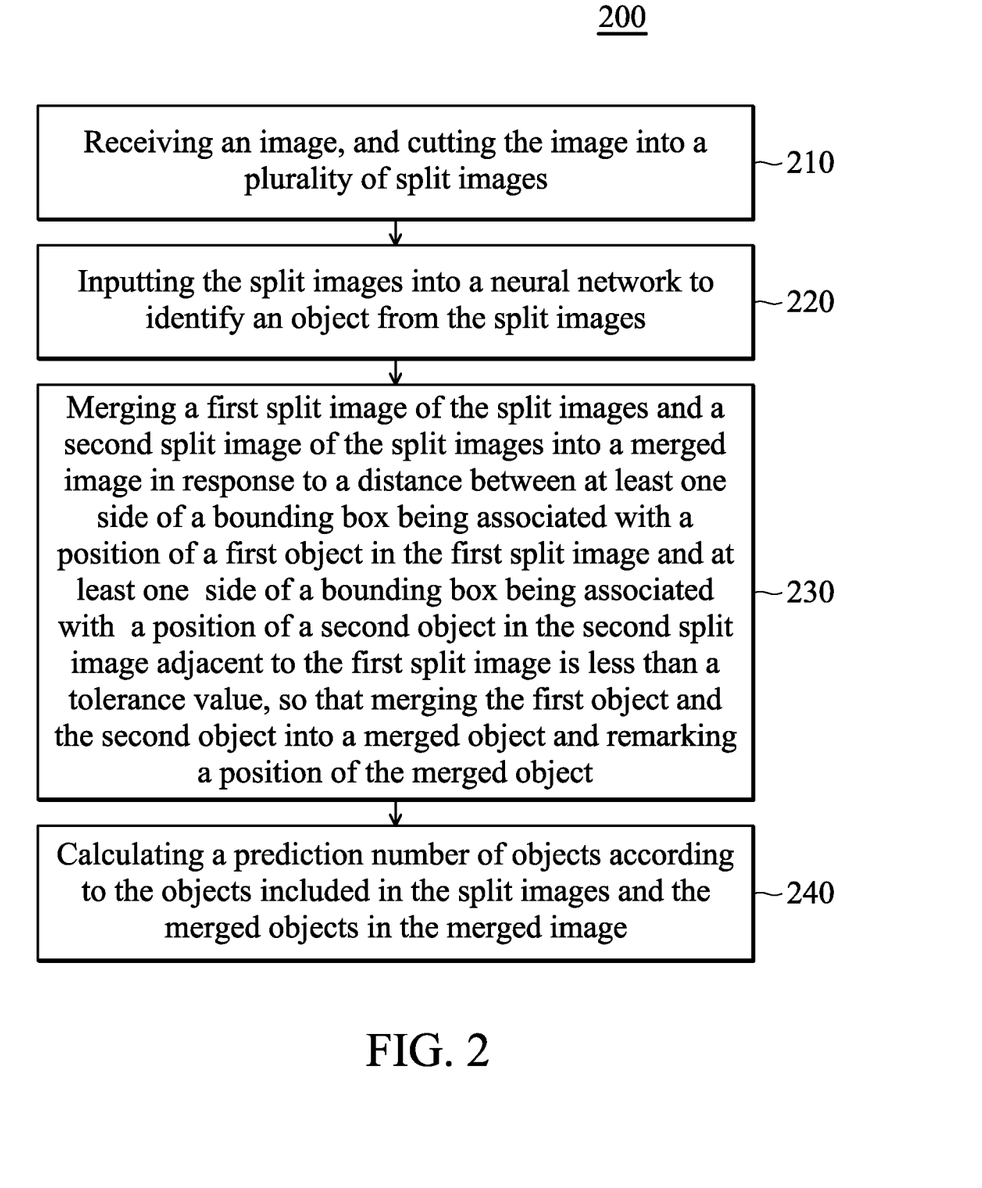
FIG. 2 is a flowchart of an object counting method in accordance with one embodiment of the present disclosure.
Figure 3:
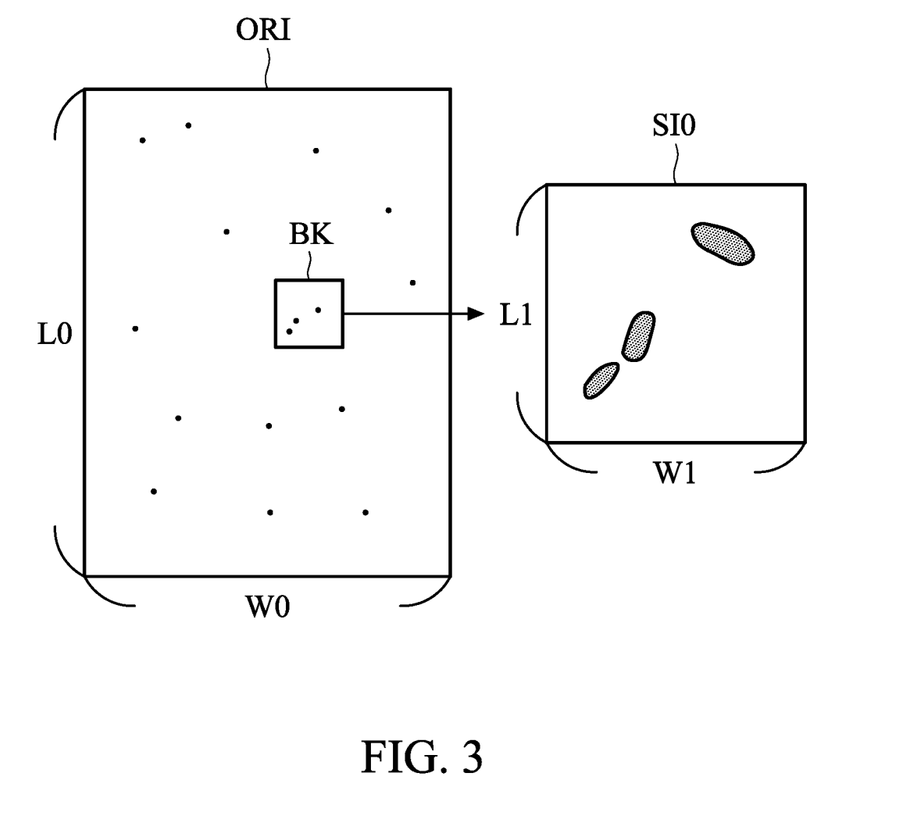
FIG. 3 is a schematic diagram of a high-resolution image and its split image in accordance with one embodiment of the present disclosure.

Please refer to FIGS. 1-3, FIG. 1 is a block diagram of an object counting system 100 in accordance with one embodiment of the present disclosure. FIG. 2 is a flowchart of an object counting method 200 in accordance with one embodiment of the present disclosure. The object counting method 200 can be implemented using the object counting system 100. FIG. 3 is a schematic diagram of a high-resolution image ORI and its split image SI0 in accordance with one embodiment of the present disclosure.

In one embodiment, as shown in FIG. 1, the object counting system 100 includes a processor 10 and a storage device 20. In one embodiment, the object counting system 100 can be applied to calculate small objects, such as bug eggs (sometimes also called eggs for short hereinafter), rice grains, larvae, egg sheaths, etc.

In one embodiment, the processor 10 is coupled to the storage device 20, and the processor 10 is used to access programs stored in the storage device 20 to realize the function of an image-cutting module 22, an image-object detection module 24, a stitching module 26 and a result-analysis module 28.

In one embodiment, the processor 10 can be implemented using an integrated circuit such as a micro controller, a microprocessor, a Digital Signal Processor (DSP), a Field Programmable Gate Array (FPGA), an Application Specific Integrated Circuit (ASIC), or a logic circuit.

In one embodiment, the storage device 20 can be realized by read-only memory, flash memory, floppy disk, hard disk, optical disk, flash drive, tape, network accessible database or storage medium with the same function.

In one embodiment, the image-cutting module 22, the image-object detection module 24, the stitching module 26, and the result-analysis module 28 can be implemented using software.

In one embodiment, the image-cutting module 22, the image-object detection module 24, the stitching module 26, and the result-analysis module 28 can be implemented using a hardware circuit independent of the storage device 20 or implemented using chips with specific functions.

In one embodiment, the camera CAM is a high-resolution camera for shooting water-absorbent fabrics to obtain an image ORI. In one embodiment, the image ORI can be the high-resolution image ORI. As shown in FIG. 3, the high-resolution image ORI may contain multiple eggs (small black dots are the eggs). Through the high-resolution image, the eggs on the absorbent cloth can be clearly seen.

In one embodiment, the communication connection LK is established between the camera CAM and the object counting system 100 in a wired or wireless manner. The object counting system 100 can receive the high-resolution image ORI from the camera CAM through the communication connection LK. In one embodiment, the object counting system 100 stores the high-resolution image ORI in the storage device 20.

The following describes the implementation steps of the object counting method 200. In one embodiment, the object counting method 200 can be applied to calculate small objects, such as eggs, rice grains, larvae, egg sheaths, etc.

In step 210, the image-cutting module 22 receives an image, and cuts the image into a plurality of split images.

For example, please refer to FIG. 3, the high-resolution image ORI is an image with a length L0 of 6000 pixels and a width W0 of 8000 pixels (i.e., 6000*8000 pixels). The image-cutting module 22 cuts the high-resolution image ORI into multiple split images.

For example, the image-cutting module 22 cuts the original block BK in the high-resolution image ORI as a split image SI0, which is an image with a length L1 of 256 pixels and a width W1 of 256 pixels (i.e., 256*256 pixels).

In one embodiment, the split image SI0 can be enlarged, so that the eggs in the split image SI0 can be seen more clearly. In this example, it can be seen that there are three black dots in the enlarged split image SI0, representing three eggs.

Here, a split image SI0 is used as a representative for illustration. In a practical example, a high-resolution image ORI of 6000*8000 pixels can be split into 713 split images of 256*256 pixels.

In one embodiment, the image-cutting module 22 can cut out multiple split images of 256*256 pixels from the upper left corner of the high-resolution image ORI toward the upper right corner (regarded as the first row, that is, the horizontal direction).

Then, the image-cutting module 22 cuts out multiple split images of 256*256 pixels from the upper left corner which is moved down 256 pixels toward the upper right corner which is moved down 256 pixels (regarded as the second row, that is, in the horizontal direction).

Then, the image-cutting module 22 cuts out multiple split images of 256*256 pixels from 512 pixels which is moved down from the upper left corner toward the 512 pixels which is moved down from the upper right corner (regarded as the third row, in the horizontal direction) until the whole high-resolution image ORI is split.

According to the rule (i.e., Z-shaped cutting sequence), the image-cutting module 22 splits the high-resolution image ORI into 713 split images of 256*256 pixels.

In one embodiment, the image-cutting module 22 can randomly cut out 5 split images of 256*256 pixels in the high-resolution image ORI according to a preset number (for example, 5).

In one embodiment, the pixel size of the high-resolution image ORI is not limited to 6000*8000 pixels, and here is only an example. For example, the pixel size of the high-resolution image ORI can also be 8000*10000 pixels, 6000*10000 pixels and so on.

In one embodiment, the pixel size of the split image (for example, the split image SI0) is not limited to 256*256 pixels, and this is only an example. For example, the pixel size of the split image can also be 512*512 pixels and/or 128*128 pixels and so on.

In one embodiment, the image-cutting module 22 cuts the high-resolution image ORI that has been manually marked with the position of the eggs into multiple split images to train a neural model. The trained neural model can be used in the subsequent step 220 for application. The training of the neural model is similar to the general training method, so it will not be repeated.

Please refer to FIGS. 4A to 4D. FIGS. 4A to 4D are schematic diagrams illustrating a method for splitting images in accordance with one embodiment of the present disclosure.

In one embodiment, the image-cutting module 22 translates a cutting range of the high-resolution image ORI.

In one embodiment, the image-cutting module 22 ignores a plurality of X-axis pixel values in the high-resolution image ORI, and ignores a plurality of Y-axis pixel values in the high-resolution image ORI, and then the image-cutting module 22 shifts the cropping range of the high-resolution image ORI. The image-cutting module 22 crops the cropping range of the high-resolution image after shifting the split images.

For example, the image-cutting module 22 performs shifting for a high-resolution image ORI four times, and performs image splitting once for each shifting, so that the same pixel size of the split image (for example, 256*256 pixels) is used. These four splitting images have different cropping results.

Figure 4A:
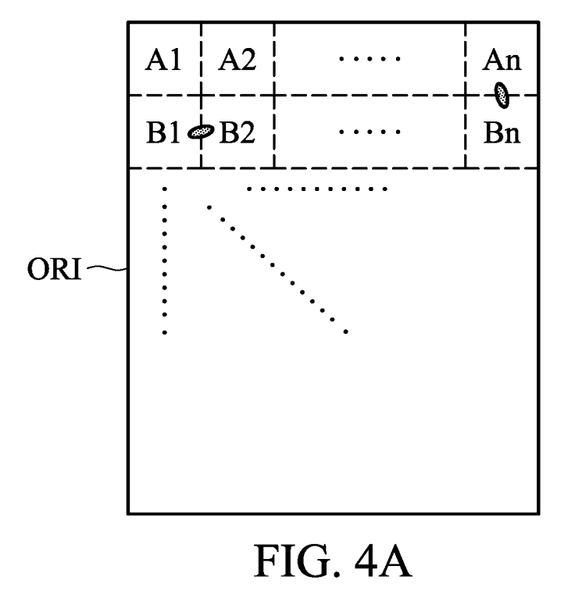
FIGS. 4A-4D are schematic diagrams illustrating a method for splitting images in accordance with one embodiment of the present disclosure.

In one embodiment, the image-cutting module 22 crops the high-resolution image ORI without shifting into a plurality of initial split images with a size of N*N pixels. The initial split image is part of multiple split images (it can also be a method of cropping high-resolution images ORI). The result-analysis module 28 calculates the predicted number of objects in these initial split images (the objects below all refer to the objects to be calculated). The result-analysis module 28 regards the prediction number as an initial prediction number. N is a positive integer.

For example, FIG. 4A is a high-resolution image ORI that has not been shifted. There is an egg between the split images B1 and B2, and there is an egg between the split images An and Bn. In one embodiment, the image-cutting module 22 splits all the pixels by the split images in the high-resolution image ORI.

Figure 4B:
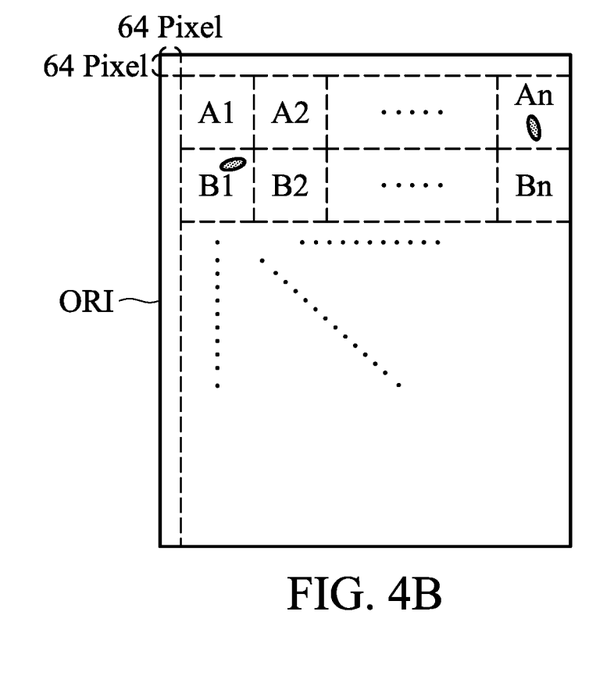

In one embodiment, the image-cutting module 22 ignores the high-resolution image X-axis shifted to the right by ¼*N pixels, and ignores the Y-axis shifted down by ¼*N pixels to obtain a first cropping range. The image-cutting module 22 crops a plurality of first shifted split images whose first cutting range is N*N pixels. The first shifted split images are part of multiple split images (it can also be a method of cropping high-resolution images ORI). The result-analysis module 28 calculates the first prediction number of objects in the first shifted images.

In one embodiment, the result-analysis module 22 calculates the average value of the initial prediction number and the first prediction number to obtain the prediction number of the object.

For example, FIG. 4B is a high-resolution image ORI with pixels shifted by ¼*256 (equal to 64 pixels) on both the X axis and the Y axis. There is an egg in the split image B1, and there is an egg in the split image An. In one embodiment, the image-cutting module 22 splits all the pixels by split images in the first cutting range.

Figure 4C:
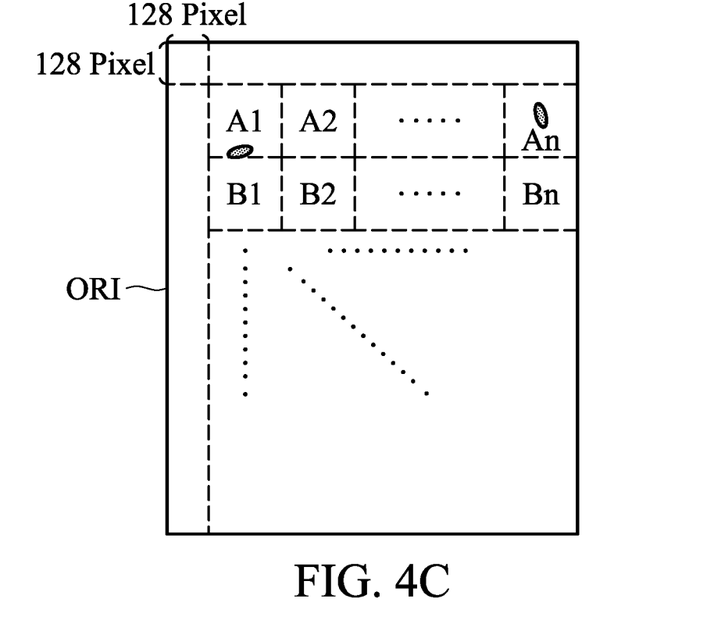

In one embodiment, the image-cutting module 22 ignores the high-resolution image X-axis shifted to the right by ½*N pixels, and ignores the Y-axis shifted down by ½*N pixels to obtain a second cropping range. The image-cutting module 22 crops a plurality of second shifted split images whose second cutting range is N*N pixels. The second shifted split images are part of multiple split images (it can also be a method of cropping high-resolution images ORI). The result-analysis module 28 calculates the second prediction number of objects in the second shifted images.

In one embodiment, the processor 20 calculates the average of the initial prediction number, the first prediction number, and the second prediction number to obtain the prediction number of the object.

FIG. 4C is a high-resolution image ORI with pixels shifted by ½*256 pixels (equal to 128 pixels) with both X-axis and Y-axis. There is an egg in the split image A1 and there is an egg in the split image An. In one embodiment, the image-cutting module 22 splits all the pixels by split images in the second cutting range.

Figure 4D:
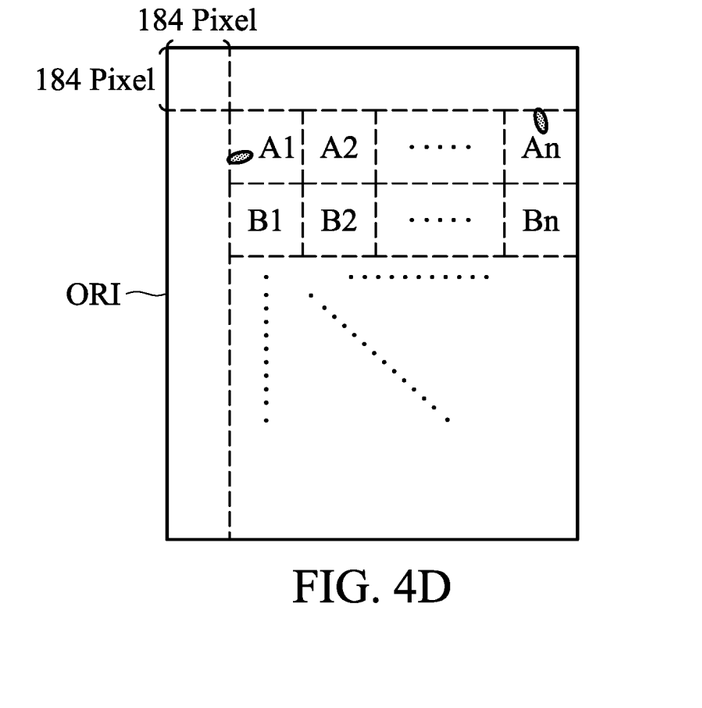

In one embodiment, the image-cutting module 22 ignores the high-resolution image X-axis shifted to the right by ¾*N pixels, and ignores the Y-axis shifted down by ¾*N pixels to obtain a third cropping range. The image-cutting module 22 crops a plurality of third shifted split images whose second cutting range is N*N pixels. The third shifted split images are part of multiple split images (it can also be a method of cropping high-resolution images ORI). The result-analysis module 28 calculates the third prediction number of objects in the third shifted images.

In one embodiment, the processor 20 calculates the average of the initial prediction number, the first prediction number, the second prediction number, and the third prediction number to obtain the prediction number of the object.

FIG. 4D is a high-resolution image ORI with shifted by ¾*256 pixels (equal to 184) with both the X axis and the Y axis. There is an egg in the split image A1 and an egg in the split image An. In one embodiment, the image-cutting module 22 splits all the pixels by split images in the third cutting range.

Therefore, the same high-resolution image ORI undergoes different shift levels, and the number of eggs in each split image will be different. Since the high-resolution image ORI has many pixels (for example, 6000*8000 pixels), a slight shift will not affect too much of counting the number of eggs.

In one embodiment, the result-analysis module 28 calculates the average of the initial prediction number, the first prediction number, the second prediction number, and the third prediction number to obtain the prediction number of the object.

In one embodiment, suppose that the high-resolution image ORI in FIG. 4A is finally calculated to have 100 eggs (the initial prediction number). The high-resolution image ORI in FIG. 4B has 100 eggs (the first prediction number). The high-resolution image ORI in FIG. 4C has 200 eggs (the second prediction number). The high-resolution image ORI in FIG. 4D has 200 eggs (the third prediction number), and the result-analysis module 28 sums up these values and divides them by four (that is, calculate the summed average (100+100+200+200)/4=150). Therefore, it is predicted that there are 150 eggs in the high-resolution image ORI.

On the other hand, if two pixel sizes of the split image are used (for example, 256*256 pixels and 512*512 pixels) to perform 4 kinds of the shifted high-resolution images ORI (or without shifting) and then splitting (as shown in FIGS. 4A-4D), 8 kinds of cropping results will be obtained, so that more split images can be input to the neural network later, and the prediction of the neural network can be more accurate.

Figure 5:
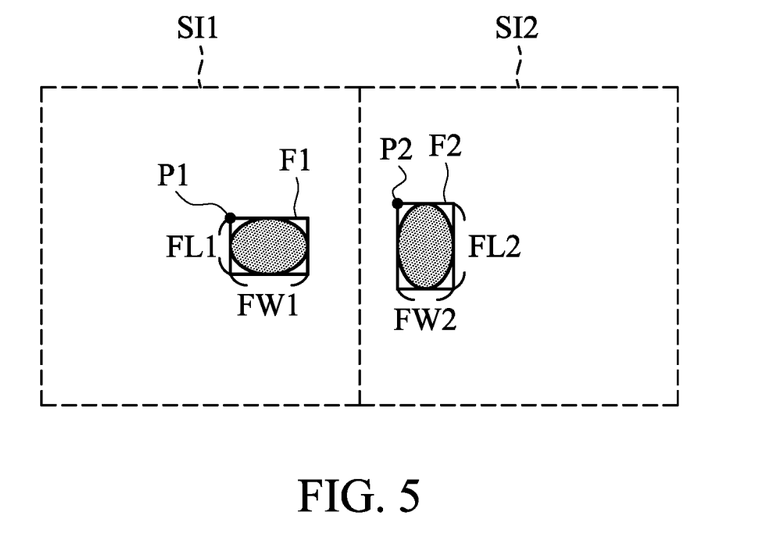
FIG. 5 is a schematic diagram of multiple split images in accordance with one embodiment of the present disclosure.

Please refer to FIG. 5. FIG. 5 is a schematic diagram of multiple split images in accordance with one embodiment of the present disclosure.

In step 220, the image-object detection module 24 is used to input the split images into a neural network to identify an object from the split images.

In one embodiment, the image-object detection module 24 is used to input the first split image (for example, split image SI1) into a neural network (NN), so that the neural network identifies whether there are objects in the first split image (for example, split image SI1).

In addition, the image-object detection module 24 also inputs the second split image (for example, split image SI2) of these split images into the neural network, so that the neural network can recognize whether there are objects in the second split image (for example, split image SI2).

In one embodiment, in response to the neural network determining that there is an object in the first split image (for example, the split image SI1), the neural network marks the position on the object from the first split image (for example, the split image SI1) to generate a first bounding box image.

In one embodiment, in response to the neural network determining that there is an object in the second split image (for example, the split image SI2), the neural network marks the position on the object from the second split image (for example, the split image SI2) to generate a second bounding box image.

In one embodiment, in response to the neural network determining that there is an object in the first split image (for example, the split image SI1), the neural network outputs information including the vertex coordinates, the bounding box length, and the bounding box width of the object in the first split image.

In one embodiment, when the neural network determines that there is an object in the second split image (for example, the split image SI2), the neural network outputs information that includes the vertex coordinates, the bounding box length, and the bounding box width of the object in the second split image.

When the neural network determines that the first split image SI1 includes an object (for example, a bug egg), the output first bounding box image includes the first bounding box position F1 of the object. When the neural network determines that the second split image SI2 includes an object, the output second bounding box image includes the second bounding box position F2 of the object.

As shown in FIG. 4, the first bounding box position F1 is a bounding box position based on the shape of the egg (black dot), and the second bounding box position F2 is a bounding box position based on the shape of the egg (black dot).

In one embodiment, the first bounding box image includes the vertex coordinates of the first bounding box position F1 (for example, the coordinates of the top left vertex P1), the bounding box length of the first bounding box position F1 (for example, the length FL1), and the bounding box width of the first bounding box position (for example, width FW1). In some embodiments, the neural network only needs to output these three parameters to be able to ascertain the position of the first bounding box position F1 in the first split image SI1, without outputting the entire bounding box image.

In one embodiment, the second bounding box image includes the vertex coordinates of the second bounding box position F2 (for example, the coordinates of the top left vertex P2), the bounding box length of the second bounding box position F2 (for example, the length FL2), and the bounding box width of the first bounding box position (for example, width FW2). In some embodiments, the neural network only needs to output these three parameters to be able to ascertain the position of the second bounding box position F2 in the first split image SI2, without outputting the entire bounding box image.

In one embodiment, the function of the neural network is object recognition, for example, using Yolo (You Only Look Once), Fast R-CNN, SSD (Single Shot MultiBox Detector), etc. to implement it.

In step 230, the stitching module 26 merges a first split image of the split images and a second split image of the split images into a merged image in response to a distance between at least one side of a bounding box being associated with a position of the first object in the first split image and at least one side bounding box being associated with the position of the second object in the second split image adjacent to the first split image is less than a tolerance value, so that the first object and the second object are merged into a merged object and the position of the merged object is remarked.

In one embodiment, the stitching module 26 is used in response to the distance between at least one frame side at the first bounding box position F1 (the position of the first object) and at least one frame side of the second bounding box position F2 (the position of the second object) is less than the tolerance value t (for example, 6 pixels), the first bounding box position F1 and the second bounding box position F2 are merged into a merged bounding box image, so that the first object (in the first bounding box position F1) and the second object (the object in the second bounding box position F2) are merged into a merged object, and the position of the merged object is remarked.

Figure 6A:
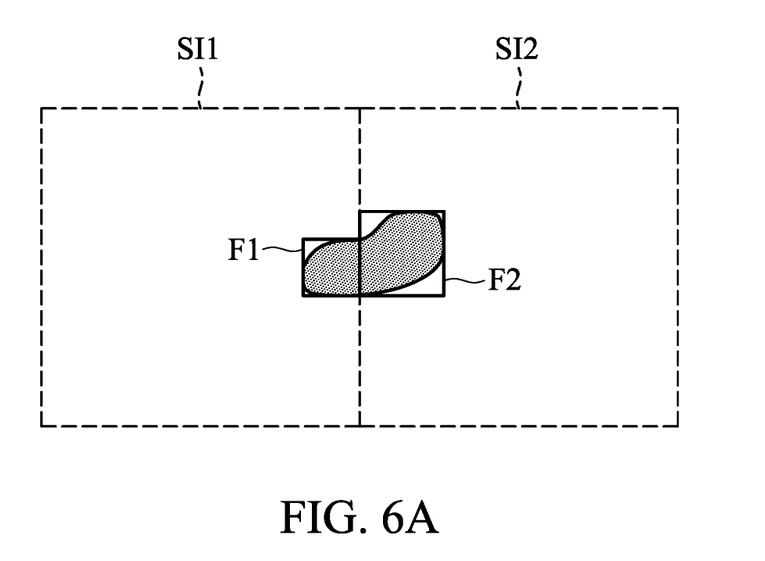
FIGS. 6A-6B are schematic diagrams of multiple split images in accordance with one embodiment of the present disclosure.
Figure 6B:
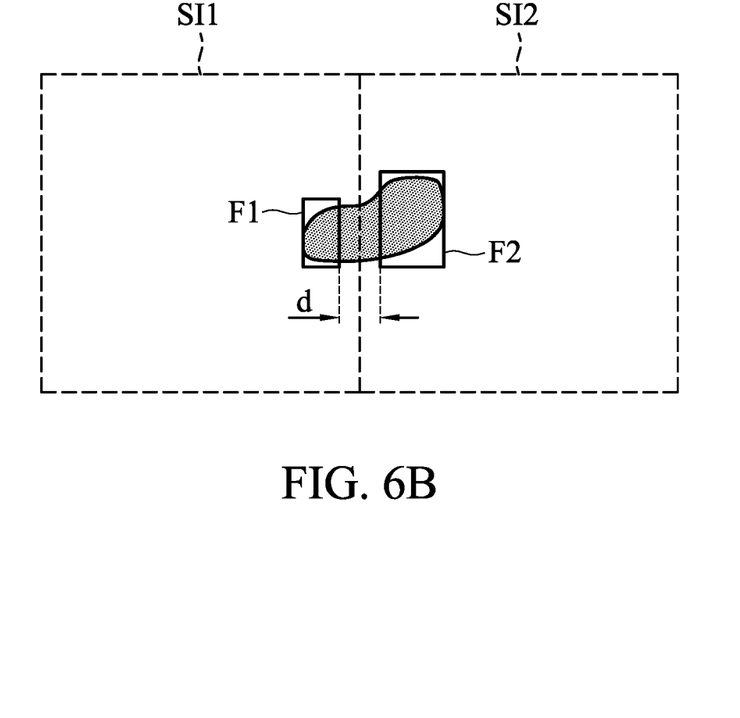

Please refer to FIGS. 6A to 6B. FIGS. 6A to 6B are schematic diagrams of multiple split images in accordance with one embodiment of the present disclosure.

In the example in FIG. 6A, the eggs in the first bounding box position F1 of the first split image SI1 and the second bounding box position F2 of the second split image SI2 are the same, but the image is split when the egg is cut into two halves. In view of this situation, it is necessary to stitch the framed images, for example, merge the first framed position F1 with the second framed position F2 (as a merged image), so that the eggs in the first framed position F1 and the second framed position F2 are merged into one egg (regarded as a merged object), so that the counting error will not occur.

In the example in FIG. 6B, the eggs in the first bounding box position F1 of the first split image SI1 and the second bounding box position F2 of the second split image SI2 are the same. When the image is split, the egg is cut into two halves with left and right. The bounding box position is a bit inaccurate. The egg bounding box is not complete. Therefore, there is a gap d (that is, a distance) between most adjacent frames of the first bounding box position F1 and the second bounding box position F2.

In view of this situation, if the gap d (for example, 5 pixels) is smaller than the tolerance value t (for example, 6 pixels), then the bounding box image should be stitched. For example, the first bounding box position F1 and the second bounding box position F2 are merged (the first bounding box position F1 and the second bounding box position F2 are merged as a merged image), so that the egg in the first bounding box position F1 and the egg in the second bounding box position F2 are merged into one egg (the eggs in the first bounding box position F1 and the second bounding box position F2 are merged as a merged object). Therefore, the count value of the combined eggs is 1.

Conversely, if the gap d (for example, 8 pixels) is greater than or equal to the tolerance value t (for example, 6 pixels), the stitching module 26 will determine the egg in the first bounding box position F1 and the egg in the second bounding box position F2 are the different eggs, the count value of eggs here is 2.

Figure 7A:
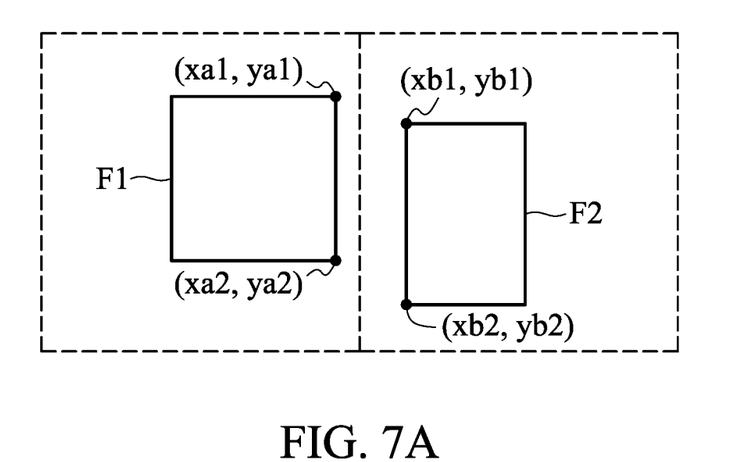
FIGS. 7A-7C are schematic diagrams illustrating a method for determining whether to merge bounding box positions in accordance with one embodiment of the present disclosure.
Figure 7B:
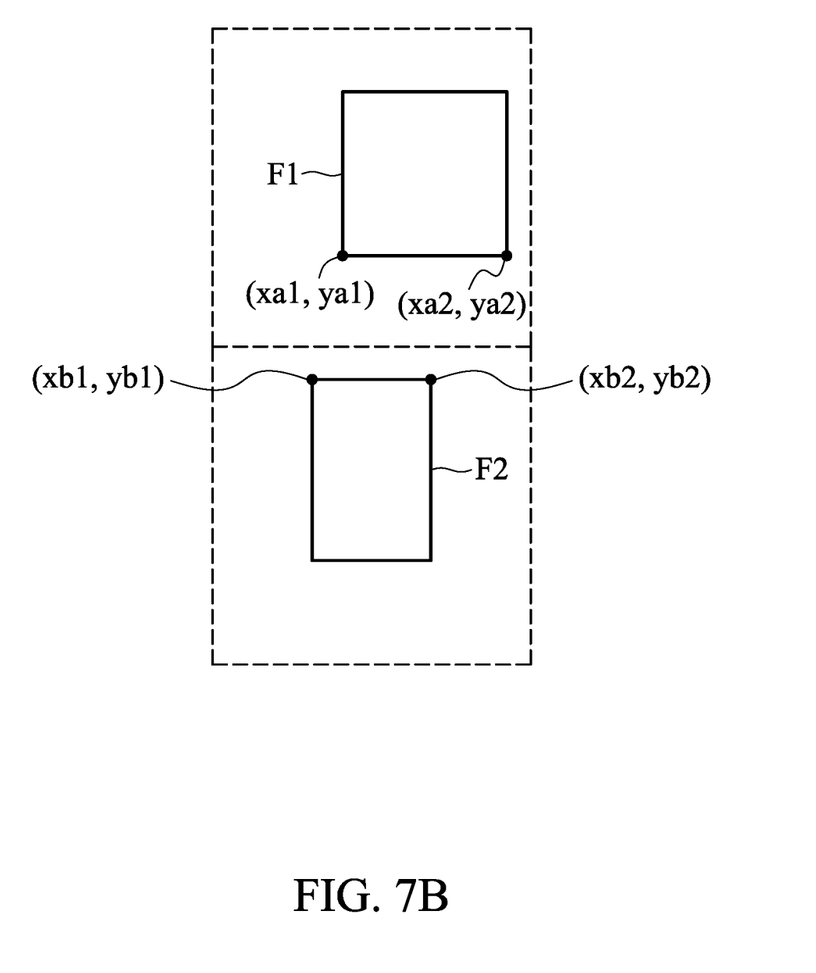
Figure 7C:
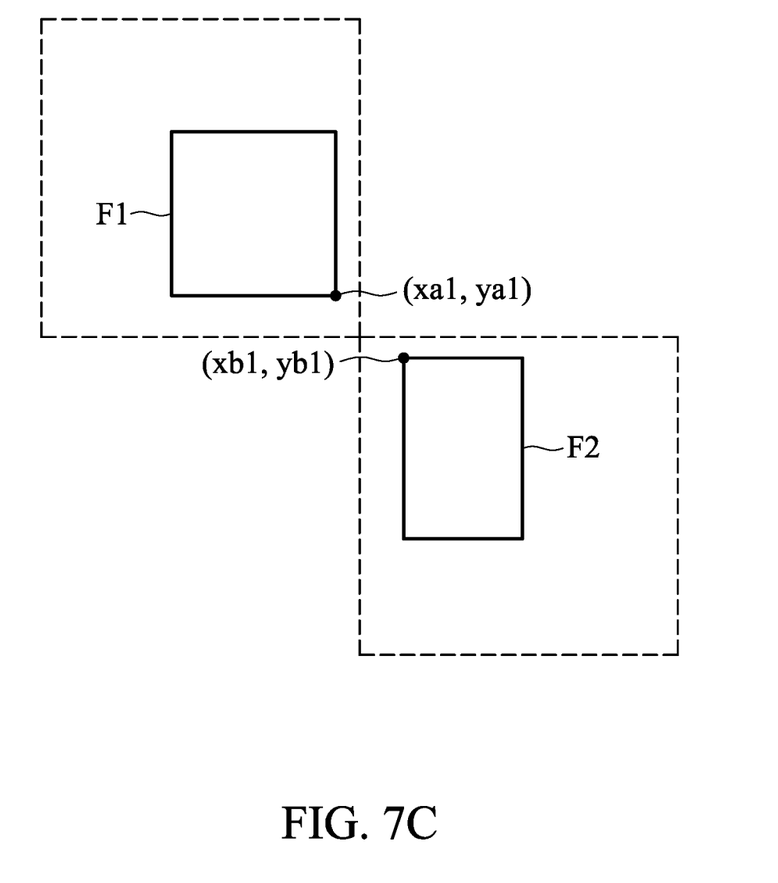

Please refer to FIGS. 7A-7C. FIGS. 7A-7C are schematic diagrams illustrating a method for determining whether to merge bounding box positions in accordance with one embodiment of the present disclosure. The dotted boxes in FIGS. 7A-7C represent split images.

The multiple coordinates, the first bounding box position F1, the second bounding box position F2 and other information in FIGS. 7A-7C can be obtained from the output data of the neural network in step 220.

As shown in FIG. 7A, when the first bounding box position F1 is located on the left side of the second bounding box position F2, if the absolute value that the X-axis coordinates of the upper-right vertex ax1 of the first bounding box position F1 is subtracted from the X-axis coordinates of the upper-left vertex xb1 of the second bounding box position F2 is less than the tolerance value t, the absolute value that the Y-axis coordinates of the upper-right vertex ya1 of the first bounding box position F1 is subtracted from the Y-axis coordinates of the upper-left vertex yb1 of the second bounding box position F2 is less than the tolerance value t, the absolute value that the X-axis coordinates of the lower-right vertex xa2 of the first bounding box position F1 is subtracted from the X-axis coordinates of the lower-left vertex xb2 of the second bounding box position F2 is less than the tolerance value t, and the absolute value that the Y-axis coordinates of the lower-right vertex ya2 of the first bounding box position F2 is subtracted from the Y-axis coordinates of the lower-left vertex yb2 of the second bounding box position F2 is less than the tolerance value t, then the first bounding box position F1 and the second bounding box position F2 are merged into a merged bounding box position by the stitching module 26. It means that the egg in the first bounding box position F1 and the egg in the second bounding box position F2 are the same eggs, not two eggs, but they are split into two bounding box positions. Therefore, merging the first bounding box position F1 and the second bounding box position F2 as merged bounding box position, and the number of eggs in the merged bounding box position is regarded as 1.

As shown in FIG. 7B, when a bounding box position F1 is located on the upper side of the second bounding box position F2, if the absolute value that the X-axis coordinates of the lower-left vertex xa1 of the first bounding box position F1 is subtracted from the X-axis coordinates of the upper-left vertex xb1 of the first bounding box position F2 is less than the tolerance value t, the absolute value that the Y-axis coordinates of the lower-left vertex ya1 of the first bounding box position F1 is subtracted from the Y-axis coordinates of the upper-left vertex yb1 of the second bounding box position F2 is less than the tolerance value t, the absolute value that the X-axis coordinates of the upper-right vertex xa2 of the first bounding box position F1 is subtracted from the X-axis coordinates of the lower-right vertex xb2 of the second bounding box position F2 is less than the tolerance value t, and the absolute value that the Y-axis coordinates of the lower-right vertex ya2 of the first bounding box position F2 is subtracted from the Y-axis coordinates of the upper-right vertex yb2 of the second bounding box position is less than the tolerance value t, then the first bounding box position F1 and the second bounding box position F2 are merged into a merged bounding box position by the stitching module 26. It means that the egg in the first bounding box position F1 and the egg in the second bounding box position F2 are the same eggs, not two eggs, but they are split into two bounding box positions. Therefore, merging the first bounding box position F1 and the second bounding box position F2 as merged bounding box position, and the number of eggs in the merged bounding box position is regarded as 1.

As shown in FIG. 7C, when the first bounding box position F1 is located on the upper-left side of the second bounding box position F2, if the absolute value that the X-axis coordinates of the lower-right vertex xa1 of the first bounding box position F1 is subtracted from the X-axis coordinates of the upper-left vertex xb1 of the first bounding box position F1 is less than the tolerance value t, the absolute value that the Y-axis coordinates of the lower-right vertex ya1 of the first bounding box position F1 is subtracted from the Y-axis coordinates of the upper-left vertex yb1 of the second bounding box position F2 is less than the tolerance value t, then the first bounding box position F1 and the second bounding box position F2 are merged into a merged bounding box position. It means that the egg in the first bounding box position F1 and the egg in the second bounding box position F2 are the same eggs, not two eggs, but they are split into two bounding box positions. Therefore, merging the first bounding box position F1 and the second bounding box position F2 as merged bounding box position, and the number of eggs in the merged bounding box position is regarded as 1.

It can be seen from the above that the formula for judging whether the first bounding box position F1 and the second bounding box position F2 need to be combined is:

$$|xa1-xb1|<t \text{ and } |ya1-yb1|<t$$

$$|xa2-xb2|<t \text{ and } |ya2-yb2|<t$$

In the two situations shown in FIGS. 7A to 7B, when the above formulas are satisfied, the first bounding box position F1 and the second bounding box position F2 are merged. In the situation shown in FIG. 7C, as long as the above-mentioned first formula is satisfied, the first bounding box position F1 and the second bounding box position F2 are merged.

In some cases, the same egg may be split into 3 or 4 bounding box positions, and it is also possible to determine whether these 3 or 4 bounding box positions need to be merged by the above method. If it is necessary to merge these 3 or 4 bounding box positions to generate a merged bounding box position, the number of eggs in the merged bounding box position is regarded as 1.

In step 240, the result-analysis module 28 calculates a prediction number of objects according to the objects included in the split images and the merged objects in the merged image.

For example, the high-resolution image ORI can be split into 713 split images of 256*256 pixels. If each of all split images A1-A10 has 2 eggs, each merged image (assuming 40 pieces) has 1 egg, and the other split images have no eggs.

The prediction number of the eggs can be calculated by 2*10+40=60. Therefore, in the high-resolution image ORI, the predicted number of eggs is 60.

For another example, a high-resolution image ORI of 6000*8000 pixels can be split into 713 split images of 256*256 pixels. After inputting the 713 split images into the neural network, the neural network outputs 713 bounding box positions (in this example, every time a split image is input to the neural network, the neural network outputs a number of selected positions, and each number of selected positions represents 1 egg). The result-analysis module 28 adds up the eggs in these bounding box positions (for example, the total number of bounding boxes is 71300, and there are 71300 eggs), and then subtracts the total number of merged bounding box positions (assuming that in this example, the situation of all the merged bounding box positions is that the same egg is split into two split images. For example, there are 300 merged bounding box positions in total, and there are 300 eggs that are repeatedly counted). As such, the predicted number of eggs is 71,000.

In an example, the result-analysis module 28 uses split images of two sizes (the split image size is 256*256 pixels and 512*512 pixels) to obtain eight effects of predicting the number of eggs as shown in Table 1 below. MAPE is the Mean Absolute Percentage Error. The smaller the value, the smaller the error and the more correct the result. MAPE is calculated based on the number of predictions generated in step 240 and the number of manual tags (the number of manual tags is regarded as the correct result, i.e., ground truth).

TABLE 1

|  | the split image size is 256*256 pixels | the split image size is 512*512 pixels |
| --- | --- | --- |
| The accuracy of the merge (step 230) has not been used | MAPE = 11.37% | MAPE = 2.82% |
| The accuracy of using merge (step 230) | MAPE = 4.31% | MAPE = 1.65% |
| Use the average result of the combined accuracy | MAPE = (4.31% + 1.65%)/2 = 2.85% | |

It can be seen from Table 1 above that the MAPE using the average result of the combined accuracy is 2.85%.

Since MAPE is a numerical evaluation index that is often used, generally speaking, a model with MAPE <10% is acceptable.

Therefore, the object counting system and the object counting method have reached automation and can accurately calculate the number of tiny objects.

In addition, besides the eggs, the tiny objects in this case can also be applied to other tiny objects, such as rice grains, larvae, egg sheaths, etc.

In summary, the object counting system and the object counting method can automatically calculate the number of eggs on absorbent fabric through a high-resolution image, which is labor-saving and provides an accurate count.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An object counting method based on an image, comprising:
   cutting the image into a plurality of split images;
   inputting the split images into a neural network to identify an object from the split images;
   merging a first split image of the split images and a second split image of the split images into a merged image in response to a distance between at least one side of a bounding box being associated with a position of a first object in the first split image and at least one side of a bounding box being associated with a position of a second object in the second split image adjacent to the first split image is less than a tolerance value;
   merging the first object and the second object into a merged object and remarking a position of the merged object; and
   calculating a prediction number of the object according to the object in the split images and the merged object in the merged image included in the split images;
   wherein calculating the prediction number of the object comprises:
   calculating the prediction number of the object by subtracting a number of the merged object in the merged image from a number of the object in the split images.

2. The object counting method of claim 1, further comprising:
   determining to generate the bounding box which contains the object in the first split image is based on the identification of the neural network;
   wherein the bounding box includes a position information of a bounding box position including a vertex coordinates, a bounding box length, and a bounding box width.

3. The object counting method of claim 1, further comprising:
   shifting a cropping range of the image;
   ignoring a plurality of X-axis pixel values and Y-axis pixel values in the image; and
   cropping the shifted cropping range of the image as the split images.

4. The object counting method of claim 1, further comprising:
   cropping the image into a plurality of initial split images with a size of N*N pixels, wherein the initial split images are a part of the split images;
   calculating the prediction number of the object in the initial split images; and
   regarding the prediction number as an initial prediction number;
   wherein N is a positive integer.

5. The object counting method of claim 4, further comprising:
   ignoring a part of the pixels in the X-axis of the image, and ignoring a part of the pixels in the Y-axis of the image, to obtain a first cropping range;
   cropping a plurality of first shifted split images in the first cropping range, wherein the first cropping range is N*N pixels in size, and the first shifted split images are part of the split images; and
   calculating a first prediction number of the object in the first shifted images.

6. The object counting method of claim 5, further comprising:

calculating an average value of the initial prediction number and the first prediction number to obtain the prediction number of the object.

7. The object counting method of claim 2, wherein when a first bounding box position is located on the left side of a second bounding box position, in response to an absolute value that X-axis coordinates of the upper-right vertex of the first bounding box position is subtracted from X-axis coordinates of the upper-left vertex of the second bounding box position is less than the tolerance value, an absolute value that Y-axis coordinates of the upper-right vertex of the first bounding box position is subtracted from Y-axis coordinates of the upper-left vertex of the second bounding box position is less than the tolerance value, an absolute value that X-axis coordinates of the lower-right vertex of the first bounding box position is subtracted from X-axis coordinates of the lower-left vertex of the second bounding box position is less than the tolerance value, and an absolute value that Y-axis coordinates of the lower-right vertex of the first bounding box position is subtracted from Y-axis coordinates of the lower-left vertex of the second bounding box position is less than the tolerance value, then a first bounding box corresponding to the first bounding box position and a second bounding box corresponding to the second bounding box position are merged into a merged bounding box.

8. The object counting method of claim 2, wherein when a first bounding box position is located on the upper side of a second bounding box position, in response to an absolute value that X-axis coordinates of the lower-left vertex of the first bounding box position is subtracted from X-axis coordinates of the upper-left vertex of the second bounding box position is less than the tolerance value, an absolute value that Y-axis coordinates of the lower-left vertex of the first bounding box position is subtracted from Y-axis coordinates of the upper-left vertex of the second bounding box position is less than the tolerance value, an absolute value that X-axis coordinates of the lower-right vertex of the first bounding box position is subtracted from X-axis coordinates of the upper-right vertex of the second bounding box position is less than the tolerance value, and an absolute value that Y-axis coordinates of the lower-right vertex of the first bounding box position is subtracted from Y-axis coordinates of the upper-right vertex of the second bounding box position is less than the tolerance value, then a first bounding box corresponding to the first bounding box position and a second bounding box corresponding to the second bounding box position are merged into a merged bounding box.

9. The object counting method of claim 2, wherein when a first bounding box position is located on the upper-left side of a second bounding box position, in response to an absolute value that X-axis coordinates of the lower-right vertex of the first bounding box position is subtracted from X-axis coordinates of the upper-left vertex of the first bounding box position is less than the tolerance value, an absolute value that Y-axis coordinates of the lower-right vertex of the first bounding box position is subtracted from Y-axis coordinates of the upper-left vertex of the second bounding box position is less than the tolerance value, then a first bounding box corresponding to the first bounding box position and a second bounding box corresponding to the second bounding box position are merged into a merged bounding box.

10. The object counting method of claim 2, wherein when a first bounding box position is adjacent to a second bounding box position, in response to an absolute value is less than the tolerance value, a first bounding box corresponding to the first bounding box position and a second bounding box corresponding to the second bounding box position are merged into a merged bounding box, wherein the absolute value is a difference selected from at least one of the vertex of the first bounding box position in the X-axis coordinates and at least one of the vertex of the second bounding box position in the X-axis coordinates.

11. An object counting system based on an image, comprising:
a processor; and
a storage device, wherein the processor is configured to access the programs stored in the storage device to implement an image-cutting module, an image-object detection module, a stitching module and a result-analysis module, wherein:
the image-cutting module is configured to receive an image and to cut the image into a plurality of split images;
the image-object detection module is configured to input the split images into a neural network to identify an object from the split images;
the stitching module is configured to merge a first split image of the split images and a second split image of the split images into a merged image in response to a distance between at least one side of a bounding box being associated with a position of the first object in the first split image and at least one side of a bounding box being associated with a position of the second object in the second split image adjacent to the first split image is less than a tolerance value, so that the first object and the second object are merged into a merged object, and a position of the merged object is remarked; and
the result-analysis module is configured to calculate a prediction number of the object according to the object in the split images and the merged object in the merged image included in the split images;
wherein the result-analysis module calculates the prediction number of the object by:
subtracting a number of the merged object in the merged image from a number of the object in the split images.

12. The object counting system of claim 11, wherein the bounding box comprises the object in the first split image of the split images which is generated according to the identification of the neural network, wherein the bounding box includes position information of a bounding box position including vertex coordinates, a bounding box length, and a bounding box width.

13. The object counting system of claim 11, wherein the image-cutting module is configured to shift a cropping range of the image, ignore a plurality of X-axis pixel values and Y-axis pixel values in the image; and crop the shifted cropping range of the image as the split images.

14. The object counting system of claim 11, wherein the image-cutting module is configured to crop the image into a plurality of initial split images with a size of N*N pixels, wherein the initial split images are a part of the split images, and the result-analysis module calculates the prediction number of the object in the initial split images;
wherein the result-analysis module is configured to regard the prediction number as an initial prediction number;
wherein N is a positive integer.

15. The object counting system of claim 14, wherein the image-cutting module is configured to ignore a part of the pixels in the X-axis of the image, and ignore a part of the pixels in the Y-axis of the image, to obtain a first cropping range; crop a plurality of first shifted split images in the first cropping range, wherein the first cropping range is N*N pixels in size; the first shifted split images are part of the split images; and the result-analysis module calculates a first prediction number of the object in the first shifted images.

16. The object counting system of claim 15, wherein the result-analysis module is configured to calculate the average value of the initial prediction number and the first prediction number to obtain the prediction number of the object.

17. The object counting system of claim 12, wherein when a first bounding box position is located on the left side of a second bounding box position, in response to an absolute value that X-axis coordinates of the upper-right vertex of the first bounding box position subtracted from X-axis coordinates of the upper-left vertex of the second bounding box position is less than the tolerance value, an absolute value that Y-axis coordinates of the upper-right vertex of the first bounding box position is subtracted from Y-axis coordinates of the upper-left vertex of the second bounding box position is less than the tolerance value, an absolute value that X-axis coordinates of the lower-right vertex of the first bounding box position is subtracted from X-axis coordinates of the lower-left vertex of the second bounding box position is less than the tolerance value, and an absolute value that Y-axis coordinates of the lower-right vertex of the first bounding box position is subtracted from Y-axis coordinates of the lower-left vertex of the second bounding box position is less than the tolerance value, then a first bounding box corresponding to the first bounding box position and a second bounding box corresponding to the second bounding box position are merged into a merged bounding box.

18. The object counting system of claim 12, wherein when a first bounding box position is located on the upper side of a second bounding box position, in response to an absolute value that X-axis coordinates of the lower-left vertex of the first bounding box position is subtracted from X-axis coordinates of the upper-left vertex of the second bounding box position is less than the tolerance value, an absolute value that Y-axis coordinates of the lower-left vertex of the first bounding box position is subtracted from Y-axis coordinates of the upper-left vertex of the second bounding box position is less than the tolerance value, an absolute value that X-axis coordinates of the lower-right vertex of the first bounding box position is subtracted from X-axis coordinates of the upper-right vertex of the second bounding box position is less than the tolerance value, and an absolute value that Y-axis coordinates of the lower-right vertex of the first bounding box position is subtracted from Y-axis coordinates of the upper-right vertex of the second bounding box position is less than the tolerance value, then a first bounding box corresponding to the first bounding box position and a second bounding box corresponding to the second bounding box position are merged into a merged bounding box.

19. The object counting system of claim 12, wherein when a first bounding box position is located on the upper-left side of a second bounding box position, in response to an absolute value that X-axis coordinates of the lower-right vertex of the first bounding box position is subtracted from X-axis coordinates of the upper-left vertex of the first bounding box position is less than the tolerance value, an absolute value that Y-axis coordinates of the lower-right vertex of the first bounding box position is subtracted from Y-axis coordinates of the upper-left vertex of the second bounding box position is less than the tolerance value, then a first bounding box corresponding to the first bounding box position and a second bounding box corresponding to the second bounding box position are merged into a merged bounding box.

20. The object counting system of claim 12, wherein when a first bounding box position is adjacent to a second bounding box position, in response to an absolute value is less than the tolerance value, a first bounding box corresponding to the first bounding box position and a second bounding box corresponding to the second bounding box position are merged into a merged bounding box, wherein the absolute value is a difference selected from at least one of the vertex of the first bounding box position in the X-axis coordinates and at least one of the vertex of the second bounding box position in the X-axis coordinates.

* * * * *